United States Patent
Dai et al.

(10) Patent No.: US 10,090,870 B1
(45) Date of Patent: Oct. 2, 2018

(54) SIGNAL DETECTION AND POWER MEASUREMENT WITH MULTI-BAND FILTER TO MITIGATE NARROWBAND INTERFERENCE

(71) Applicant: Marvell International Ltd., Hamilton (BM)

(72) Inventors: Shaoan Dai, San Jose, CA (US);
Kok-Wui Cheong, Los Altos, CA (US);
Zhenzhong Gu, San Jose, CA (US);
Junqing Sun, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/943,275

(22) Filed: Apr. 2, 2018

Related U.S. Application Data

(63) Continuation of application No. 15/297,028, filed on Oct. 18, 2016, now Pat. No. 9,935,664.
(Continued)

(51) Int. Cl.
*H04L 27/00* (2006.01)
*H04L 5/00* (2006.01)
(Continued)

(52) U.S. Cl.
CPC .......... *H04B 1/1036* (2013.01); *H04B 1/082* (2013.01); *H04B 1/1027* (2013.01); *H04B 3/238* (2013.01); *H04B 17/327* (2015.01); *H04L 5/0048* (2013.01)

(58) Field of Classification Search
CPC .......... H04B 1/005; H04B 1/082; H04B 1/10; H04B 1/1027; H04B 1/76; H04B 15/00; H04L 27/38; H04L 27/3809
See application file for complete search history.

(56) References Cited

U.S. PATENT DOCUMENTS

| | | |
|---|---|---|
| 3,215,934 A | 11/1965 | Sallen |
| 4,985,899 A | 1/1991 | Walsh |

(Continued)

OTHER PUBLICATIONS

"Draft Standard for Ethernet Amendment 4: Physical Layer Specifications and Management Parameters for 1 Gb/s Operation over a Single Twisted Pair Copper Cable", IEEE P802.3bp™/D3.3, Jan. 1, 2016, 220 pages.

(Continued)

*Primary Examiner* — David S. Huang

(57) ABSTRACT

Various aspects of this disclosure describe detecting a signal and measuring power with a multi-band filter. Examples include a signal detection and power measurement module in a receiver capable of detecting a training signal and calculating a reliable power measurement in the presence of narrowband interference. A received signal is filtered by a multi-band filter comprising a plurality of sub-band filters. For instance, sub-band filters may be bandpass filters with non-overlapping pass-bands. A training signal is detected by comparing powers of each of the outputs of the sub-band filters to a plurality of thresholds. For example, each sub-band may be assigned a different threshold value. Responsive to detecting a training signal, a power measurement is determined from at least one sub-band filter output. A gain is set based on the determined power measurement, and applied in the receiver.

20 Claims, 5 Drawing Sheets

Related U.S. Application Data

(60) Provisional application No. 62/244,450, filed on Oct. 21, 2015.

(51) Int. Cl.
  *H04B 1/10* (2006.01)
  *H04B 3/23* (2006.01)
  *H04B 17/327* (2015.01)
  *H04B 1/08* (2006.01)

(56) References Cited

U.S. PATENT DOCUMENTS 6,426,983 B1 7/2002 Rakib et al.
2010/0177857 A1* 7/2010 Huttunen ............ H04L 27/2614
                                                         375/350

OTHER PUBLICATIONS

"Draft Standard for Ethernet Amendment: Physical Layer Specifications and Management Parameters for 100 MB/s Operation over a Single Balanced Twisted Pair Cable (100BASE-T1)", IEEE P802.3bw™/D3.3, Aug. 21, 2015, 91 pages.
"Notice of Allowance", U.S. Appl. No. 15/297,028, filed Nov. 17, 2017, 9 pages.

* cited by examiner

SIGNAL DETECTION AND POWER MEASUREMENT WITH MULTI-BAND FILTER TO MITIGATE NARROWBAND INTERFERENCE

CROSS REFERENCE TO RELATED APPLICATIONS

This application is a continuation of and claims priority to U.S. Utility application Ser. No. 15/297,028 filed Oct. 18, 2016, which in turn claims priority to U.S. Provisional Patent Application Ser. No. 62/244,450 filed Oct. 21, 2015, the disclosures of which are incorporated herein by reference.

BACKGROUND

High-speed communication systems are used ubiquitously in modern society. For example, nearly two-thirds of Americans own "smart phones", and the "internet of things" promises to connect everyday objects, such as keys and kitchen appliances. In another example, modern vehicles (e.g., automobiles) use sophisticated, high-speed communication systems within the vehicle itself to control various functions, such as braking, crash prevention, and self-driving (e.g., automatic parking).

Computers and sensors communicate with each other over a network in the vehicle, for instance using transceivers. During initialization of a communication link (e.g., during startup of a device) a training signal may be sent from a transmitter of one device connected to the vehicle's network to a receiver of another device connected to the vehicle's network. The training signal can be used by the receiver to synchronize the receiver to the transmitter, such as by adjusting counters, a state machine, and/or a timing loop in the receiver. The receiver may also measure power of the received training signal and set one or more gains in the receiver processing chain based on the measured power, such as a gain prior to analog-to-digital conversion for proper loading of a digital-to-analog converter, and/or a gain in an equalizer module that sets a gain at the input of the equalizer.

Various sources introduce electromagnetic interferences into the vehicle environment, such as the vehicle's ignition system, cellular phones within the vehicle, atmospheric conditions (e.g., thunderstorms, solar rays, auroras, etc.) and cross talk from computers and sensors comprising the vehicle's communication system, e.g., computing devices connected to the vehicle's network. The interference can couple onto the vehicle's communication system and be of significant power relative to desired signals within the vehicle's communication system. When interference is present during initialization and/or startup, the interference can corrupt or prevent detection of a training signal, which can cause the receiver to improperly synchronize to the transmitting device, driving equalizer coefficients in the receiver to be adapted to an unusable setting. Furthermore, a request that another transmission of the training signal be sent may be required when interference prevents proper detection of the training signal. Moreover, power measurements at the receiver can be biased due to an interferer, causing improper setting of gains in the receiver processing chain, which can introduce non-linearities into the receiver path that degrade or prevent payload recovery.

SUMMARY

This Summary is provided to introduce a selection of concepts in a simplified form that are further described below in the Detailed Description. This Summary is not intended to identify key features or essential features of the claimed subject matter.

This disclosure describes, in some aspects, a method of signal detection and power measurement comprises receiving a communications signal with a receiver. The communications signal is sampled with an analog-to-digital converter. The sampled communications signal is filtered using a plurality of sub-band filters to produce a corresponding plurality of filter outputs. A presence of a training signal is detected by comparing a power of each of the filter outputs to a different one of a plurality of thresholds. A power measurement is determined from the plurality of filter outputs responsive to detecting the presence of the training signal. A gain is set based on the determined power measurement, and the gain is applied in the receiver.

This disclosure further describes, in other aspects, a device comprises a receiver configured to receive a communications signal. The device comprises an analog-to-digital converter configured to sample the communications signal. The device also comprises a plurality of sub-band filters configured to filter the sampled communications signal to produce a corresponding plurality of filter outputs. The device also comprises a detector configured to detect a presence of a training signal based on comparing a power of each of the filter outputs to a different one of a plurality of thresholds. The device also comprises a power module configured to determine a power measurement from the plurality of filter outputs responsive to the detector detecting the presence of the training signal. The device also comprises a gain estimator configured to set a gain based on the determined power measurement. The device also comprises a gain module configured to apply the gain in the device.

This disclosure further describes, in still other aspects, a system comprises a receiver configured to receive a sampled communications signal. The system also comprises a transmitter configured to provide a reference signal for removing an echo from the sampled communications signal. The system also comprises a plurality of sub-band filters configured to filter the sampled communications signal with the echo removed to produce a corresponding plurality of filter outputs. The system also comprises a signal detection and power measurement module configured to detect a presence of a training signal based on a power of each of the filter outputs being greater than a different one of a plurality of thresholds, and, responsive to detecting the presence of the training signal, determine a power measurement from a filter output having a lowest power measurement among the plurality of filter outputs. The system also comprises a gain module configured to set a plurality of gains based on the determined power measurement and apply the plurality of gains in the system.

The foregoing is a summary and thus contains, by necessity, simplifications, generalizations and omissions of detail; consequently, those skilled in the art will appreciate that the summary is illustrative only and does not purport to be limiting in any way. Other aspects, inventive features, and advantages of the devices and/or processes described herein, as defined solely by the claims, will become apparent in the non-limiting detailed description set forth herein.

BRIEF DESCRIPTION OF DRAWINGS

The detailed description references the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
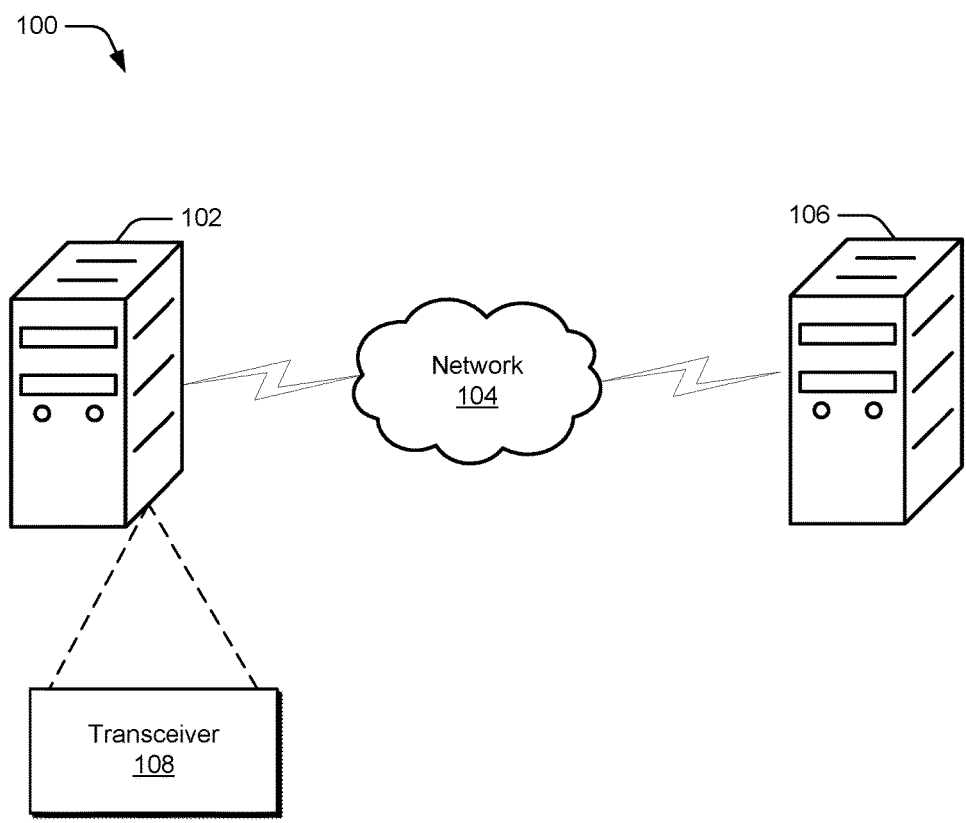
FIG. 1 illustrates an example operating environment in accordance with one or more aspects of the disclosure.

Modern vehicles contain various computers and sensors that are used to control and monitor a myriad of functions within the vehicle, such as for example, adjusting the engine and the transmission, rolling up windows, unlocking doors, anti-lock braking, crash prevention, and self-driving (e.g., automatic parking). To control functions within the vehicle, sensors and switches are used to measure a variety of parameters, such as by way of example and not limitation, temperature, tire pressure, voltage, current, acceleration, braking pressure, yaw and roll of the vehicle, steering angle, user input, and the like.

Computers and sensors communicate with each other over a network in the vehicle, such as through using transceivers. During initialization of a communication link (e.g., during startup of a device) a training signal may be sent from a transmitter of one device connected to the vehicle's network to a receiver of another device connected to the vehicle's network. The training signal can be used by the receiver to synchronize the receiver to the transmitter, such as by adjusting counters, a state machine, and/or a timing loop in the receiver as well as training an equalizer. The receiver may also measure power of the received training signal and set gains in the receiver processing chain based on the measured power, such as a gain prior to analog-to-digital conversion that properly loads a digital-to-analog converter, and/or a gain in an equalizer module that sets a gain at the input of, output of, or within the equalizer.

Various sources introduce electromagnetic interferences into the vehicle environment, such as the vehicle's ignition system, cellular phones within the vehicle, TV station towers, RADARs, atmospheric conditions (e.g., thunderstorms, solar rays, auroras, etc.) and cross talk from computers and sensors comprising the vehicle's communication system. The interference can couple onto the vehicle's communication system and be of significant power relative to desired signals within the vehicle's communication system.

In contrast to methods that process the received signal using the signal's full bandwidth to detect the presence of a training signal and measure power, this disclosure describes detecting a training signal and measuring power of the training signal to set one or more gains in a receiver using a multi-band filter. The multi-band filter filters the signal's full bandwidth using a plurality of sub-band filters that each filter a portion of the full bandwidth. The inventors have determined that because interference introduced in a vehicle (e.g., automobile) environment is often narrowband interference, the interference affects only some of the sub-band filter outputs, allowing training signal detection and power measurement by monitoring powers of the sub-band filter outputs. For example, because the presence of narrowband interference in the affected sub-band will raise the power measured at the output of only the affected sub-band, the presence of a training signal can be determined when all of the sub-band filter outputs have powers above respective thresholds, and a power measurement unaffected by the narrowband interference may be determined from the sub-band filter output with the lowest power. This allows for robust and efficient signal detection and power measurement in the presence of narrowband interference.

In the following discussion, an example system including a transceiver using a multi-band filter for signal detection and power measurement is described. Techniques or procedures that elements of the example system may implement, and a device on which elements of the example system may be embodied, are also described. Consequently, performance of the example procedures is not limited to the example system and the example system is not limited to performance of the example procedures. Any reference made with respect to the example system, or elements thereof, is by way of example only and is not intended to limit any of the aspects described herein.

Example Environment

FIG. 1 illustrates example operating environment 100 in accordance with one or more aspects of the disclosure. Example environment 100 comprises computing device 102 communicating via network 104 with computing device 106. Though only two computing devices are shown connected to network 104, any suitable number of computing devices could be connected to network 104, each of which can be in communication with any combination of other computing devices. Furthermore, computing device 102 can be any suitable type of computing device, such as a sensor, a processor, or a computer in a vehicle communication system, including a communication system used in or by an automobile, boat, ship, motorcycle, aircraft (e.g., airplane, helicopter, glider, etc.), and the like. Computing device 102 can also be a client device, a desktop computer, a laptop computer, a mobile device (e.g., assuming a handheld configuration such as a tablet or mobile phone), a tablet, a camera, a gaming device, a set-top box, a satellite access terminal, a cable television receiver, an access point, a vehicle navigation computer, and the like. Thus, computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices to perform operations "over the cloud".

Though illustrated as coupled to network 104 in FIG. 1, computing device 102 can also operate stand-alone, e.g., while not connected to a network. For example, a user may disconnect computing device 102 from network 104 by any suitable fashion, such as selection of an option in a user interface to disable transceiver operation in computing device 102, and place computing device 102 in an "airplane mode".

Network 104 may comprise a variety of networks, including a vehicle network (e.g., a network in an automobile used to control functions in the automobile, including by way of example and not limitation, adjusting the engine and the transmission, rolling up windows, unlocking doors, vehicle navigation, rear-seat communications, in-vehicle entertainment, audio, video, instrument display, vehicle diagnostic display, anti-lock braking, crash prevention, automatic parking, self-driving, and the like), the Internet, an intranet, local area network (LAN), wide area network (WAN), personal area network (PAN), body area network (BAN), cellular networks, terrestrial networks, satellite networks, combinations of networks, and the like, and as such may be wired and/or wireless. In one example, network 104 comprises Ethernet cables, and routes data encoded according to a standard defined by the Institute for Electrical and Electronics Engineers (IEEE), including IEEE 802.3 bp and IEEE 802.3bw, available at https://standards.ieee.org/findstds/standard/802.3 bp-2016.html and https://standards.ieee.org/findstds/standard/802.3bw-2015.html, respectively, which are incorporated herein by reference.

Computing device 106 is a device that is communicatively coupled via network 104 to computing device 102. For instance, computing device 106 may be a processor, sensor, or computer in a vehicle communication system that controls or monitors at least one function of the vehicle. In one example, computing device 106 is a server configured to provide data and services to computing device 102 responsive to receiving a request from computing device 102. Some examples of services include, but are not limited to, a navigation service that provides navigation information, such as maps, directions, and traffic information to computing device 102, a photo editing and storage service, a web development and management service, a collaboration service, a social networking service, a messaging service, an advertisement service, and so forth. In another example, computing device 106 is a client device, and computing device 106 and computing device 102 communicate in a peer-to-peer (P2P) fashion.

Computing device 102 contains one or more transceivers an example of which is transceiver 108. Transceiver 108 comprises at least one receiver, at least one transmitter, or at least one receiver and at least one transmitter, and facilitates communication over network 104 between computing device 102 and computing devices connected to network 104, such as computing device 106. Transceiver 108 is illustrated for brevity as comprising computing device 102. Any device connected to network 104, however, can also include a transceiver, such as a transceiver substantially similar to transceiver 108 comprising computing device 102. For example, computing device 106 can also comprise a transceiver similar to transceiver 108.

In embodiments, computing device 102, network 104, and computing device 106 comprise a same vehicle, such as an automobile, a boat, a ship, a motorcycle, a trike, an all-terrain vehicle (ATV), a plane, a helicopter, a drone, a dirigible, a spacecraft, and the like. In other embodiments, computing device 102 and at least part of network 104 comprise a vehicle, and computing device 106 and at least another part of network 104 do not comprise the vehicle. For instance, computing device 102 may be part of a navigation system in an automobile that receives information from a satellite comprising computing device 106.

Figure 2:
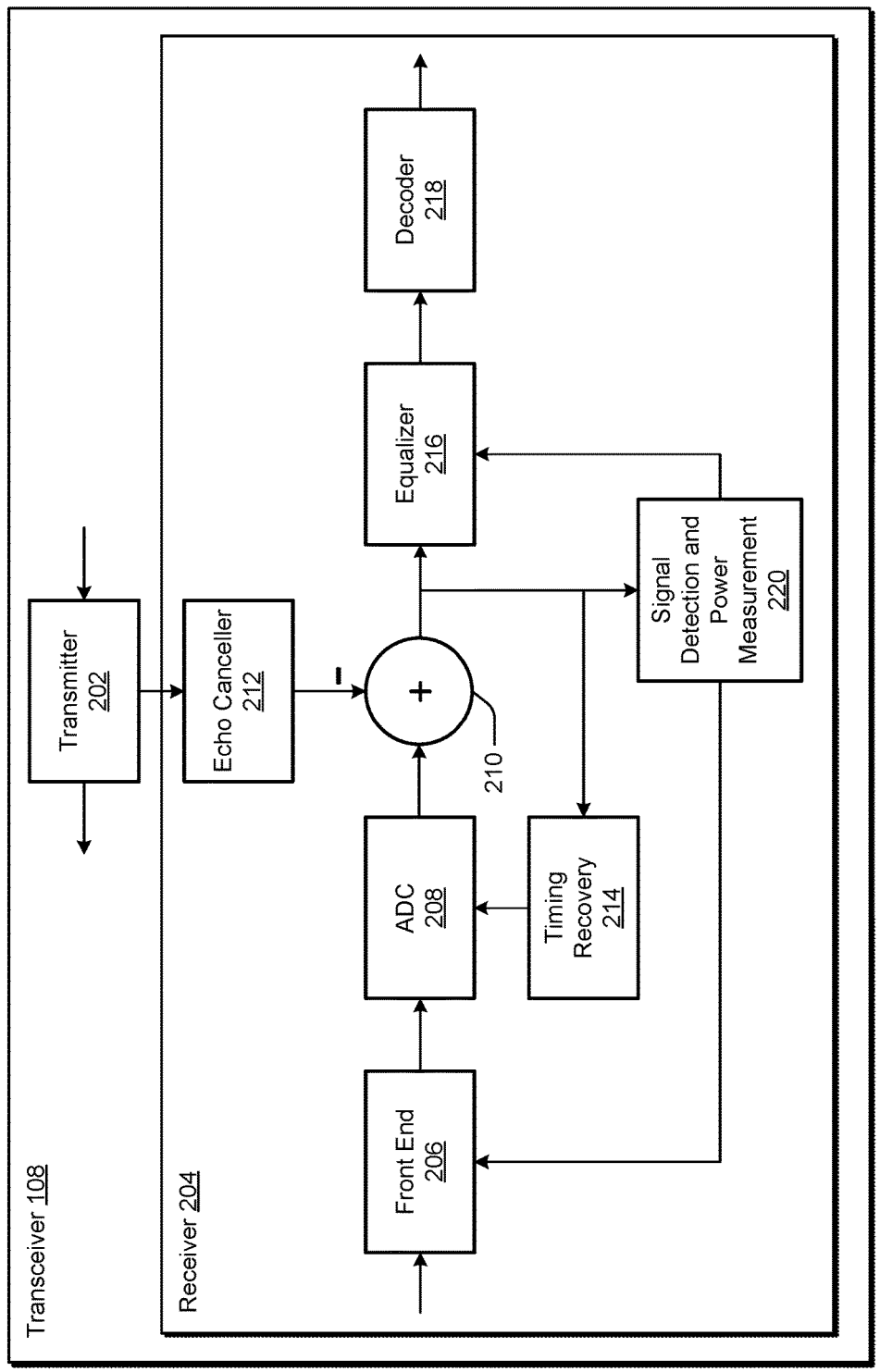
FIG. 2 illustrates an example transceiver in accordance with one or more aspects of the disclosure.

Having considered a discussion of example environment 100, consider now a discussion of an example transceiver.
Example Transceiver FIG. 2 illustrates example transceiver 108 in accordance with one or more aspects of the disclosure. Transceiver 108 comprises transmitter 202 and receiver 204. Transmitter 202 is configured to transmit a signal via network 104 from computing device 102 to another computing device connected to network 104, such as computing device 106. For example, transmitter 202 can transmit a signal that contains configuration settings to a component of a vehicle responsive to vehicle telemetry provided by the component and/or other components. Receiver 204 is configured to receive a signal via network 104 from another computing device connected to network 104, such as computing device 106. For example, receiver 204 can receive telemetry about a vehicle from a sensor in the vehicle.

Receiver 204 comprises front end 206, analog-to-digital converter (ADC) 208, adder 210, echo canceller 212, timing recovery 214, equalizer 216, decoder 218, and signal detection and power measurement 220. For simplicity, the discussion of receiver 204 is limited to these blocks. Receiver 204, however, may contain other processing blocks omitted from FIG. 2, such as, by way of example and not limitation, filters, carrier recovery, interleaving/de-interleaving, scrambling/de-scrambling, automatic gain control, transforms and inverse transforms (such as fast Fourier transform (FFT) and inverse fast Fourier transform (IFFT)), parser, and the like.

Front end 206 receives an analog signal via network 104, and contains any suitable circuitry to condition the received signal for sampling. For example, front end 206 includes a gain block, such as an amplifier, multiplier, or attenuator that is configurable to apply a gain to the received signal (e.g., in the received signal path) provided from signal detect and power measurement 220. Front end 206 may also include filters, such as an anti-alias filter, a low-pass filter, a band-pass filter, or combinations thereof. Front end 206 may also include frequency translation circuitry, such as down-conversion circuitry used to translate a radio frequency (RF) signal to an intermediate frequency (IF) signal. Accordingly, front end 206 may include frequency generation circuits such as a phase-locked loop (PLL) or synthesizer used in the frequency translation from RF to IF. In an embodiment, the received signal is a baseband signal, and consequently does not require further frequency translation.

ADC 208 samples the signal conditioned by front end 206 using any suitable sampling method. For example, ADC 208 may comprise a plurality of ADCs each used to sample a portion of the signal, which is reconstructed using the digital samples. Alternatively or additionally, ADC 208 may comprise a single ADC that samples the signal from front end 206. In an example, a sampling phase and/or sampling frequency of ADC 208 is adjusted by timing recovery 214. In another example, ADC 208 is clocked by a free-running clock, so that sampling phase and/or sampling frequency can be fixed. Furthermore, ADC 208 may assign any suitable number of bits to samples it generates, such as by way of example and not limitation, a single bit, 3 bits, 8 bits, or 16 bits. In general, the number of bits assigned per sample by ADC 208 is determined from parameters of the signal methods used, including signal bandwidth and modulation, and architecture of the ADC.

Adder 210 subtracts samples provided from echo canceller 212 from samples generated by ADC 208. The signal received by receiver 204 can contain an echo of a signal transmitted by transmitter 202, such as an echo generated by transmitting a signal from transmitter 202 comprising computing device 104 to computing device 106, and receiving a signal from computing device 106 at computing device 102 that contains a copy (sometimes referred to as a ghost or echo) of the signal transmitted from transmitter 202. By using a reference signal provided from transmitter 202, echo canceller 212 is configured to provide a signal to adder 210 that can be subtracted from the sampled signal provided by ADC 208 to substantially remove any echo contained in the sampled signal. For instance, echo canceller 212 can be configured as an adaptive filter that uses a reference signal supplied by transmitter 202 (such as a stored copy of the signal transmitted by transmitter 202) to adjust adaptive coefficients of echo canceller 212 so that samples provided from echo canceller 212 to adder 210 substantially correspond to a portion of the samples from ADC 208 corresponding to the echo. Hence, by subtracting the signal from echo canceller 212, adder 210 effectively removes the echo from the signal in the received signal path.

Timing recovery 214 uses the sampled signal with the echo removed to update parameters controlling ADC 208, such as a sampling phase and/or sampling frequency of ADC 208. Alternatively or additionally, timing recovery 214 can resample the sampled data from ADC 208, such as using interpolation. Furthermore, though timing recovery 214 is illustrated as deriving timing parameters from the sampled signal with the echo removed from adder 210, timing recovery can derive timing parameters from any suitable signal, such as a signal (not shown) from equalizer 216.

Equalizer 216 compensates the insertion loss in the received signal, such as insertion loss in the transmit channel Equalizer 216 can be any suitable type of equalizer, such as a feed-forward equalizer (FFE) comprising a transversal filter, a decision feedback equalizer (DFE) which filters symbol estimates from a slicer (e.g., a nearest-element decision device) to additively cancel InterSymbol Interference (ISI), a filter with infinite impulse response (IIR), such as an auto-regressive filter, combinations thereof, and the like. Furthermore, equalizer 216 can comprise time-domain filters, frequency-domain filters, and combinations thereof. Equalizer 216 can also comprise adaptive filters, which contain coefficients that are adjustable. Equalizer coefficients can be adjusted in any suitable fashion, such as based on a channel estimate, without a channel estimate (e.g., directly), from an error signal derived from a training signal embedded in the received sampled data, blindly (without the use of a training aid), at each symbol instance, or periodically once a predetermined number of symbols have been estimated, and the like. Moreover, equalizer coefficients can be any suitable type of coefficients, such as real-valued, complex-valued, symbol-spaced, fractionally-spaced, or combinations thereof.

Equalizer 216 also contains a gain block, such as an amplifier, multiplier, or attenuator that is configurable to apply a gain provided from signal detect and power measurement 220. Equalizer 216 can apply the gain at any suitable position within equalizer 216, such as at the input to equalizer 216, at the output of equalizer 216, after an adder comprising a DFE, before a slicer comprising a DFE, before an FFT, and the like.

Signal detect and power measurement 220 detects a presence of a training signal in the received sampled signal, and determines a power measurement. For example, signal detect and power measurement 220 takes samples of the received signal with the echo removed from adder 210 and processes the samples to determine the presence of a training signal. Responsive to detecting the presence of a training signal, signal detect and power measurement 220 determines a power measurement. Based on the determined power measurement, signal detect and power measurement 220 determines at least one gain value, and supplies the gain value to an appropriate processing block comprising receiver 204. For example, signal detect and power measurement 220 can supply a gain value to front end 206, equalizer 216, and/or echo canceller 212 to be used in multipliers, attenuators, amplifiers, or any suitable gain stage of those respective blocks.

By detecting the presence of a training signal, signal detect and power measurement 220 synchronizes to data transmitted by the transmitter that caused the received signal at receiver 204, such as a transmitter comprising computing device 106. A communication link between computing devices can therefore be established. For example, further responsive to detecting the presence of a training signal, signal detect and power measurement module 220 is configured to enable adapting equalizer coefficients comprising equalizer 216 to facilitate processing the received signal at receiver 204.

Equalized data from equalizer 216 is provided to decoder 218. Decoder 218 performs any suitable type of decoding, such as error detection and correction, scrambling/de-scrambling, interleaving/de-interleaving, parsing, framing, and the like. Decoded data is provided to higher level processing layers, control functions, or any suitable processing blocks.

In an embodiment, receiver 204 and transmitter 202 comprise a System-on-Chip (SoC) or application-specific integrated circuit (ASIC).

Having considered a discussion of example transceiver 108, consider now a discussion of example signal detection and power measurement with a multi-band filter.

Figure 3:
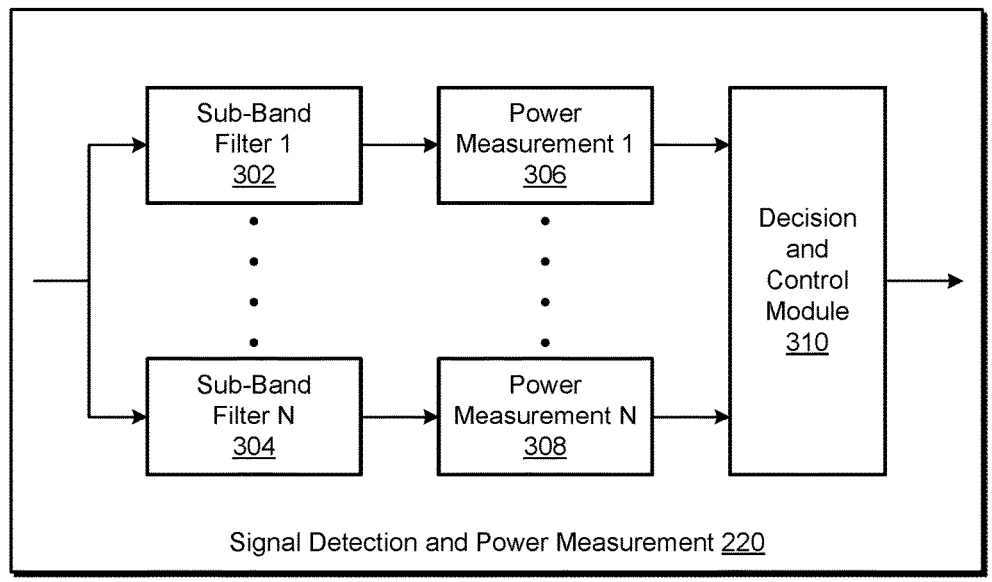
FIG. 3 illustrates example signal detection and power measurement with a multi-band filter in accordance with one or more aspects of the disclosure.

FIG. 3 illustrates example signal detection and power measurement 220 in accordance with one or more aspects of the disclosure. Signal detection and power measurement 220 receives input and provides the input to a multi-band filter comprising a plurality of sub-band filters. In one example, an input to signal detection and power measurement 220 is an output of adder 210 in FIG. 2, e.g., the sampled signal with the echo removed. In another example, such as when transceiver 108 comprises receiver 204, but does not include a transmitter, an input to signal detection and power measurement 220 can be the sampled signal without having an echo removed, since no reference signal from a transmitter is provided to the receiver.

Referring again to FIG. 3, signal detection and power measurement 220 contains a plurality of sub-band filters, sub-band filter 1 302 to sub-band filter N 304, that each receive a same input to signal detection and power measurement 220. Here, N is an integer that represents how many sub-band filters comprise the plurality of sub-band-filters. Integer N can be any suitable number of sub-band filters. In one example, N is two. In another example, N is three.

Sub-band filter 1 302 to sub-band filter N 304 are filters that process a portion of a total bandwidth, such as the bandwidth of the signal input to signal detection and power measurement 220. For instance, each sub-band filter comprising sub-band filter 1 302 to sub-band filter N 304 may be a bandpass filter that has a pass-band which is less than a total bandwidth. In one example, the pass-bands of the sub-band filters are not overlapping, e.g., the sub-band filters are bandpass filters that do not have overlapping pass-bands. In embodiments, the pass-bands of the sub-band filters do not overlap, and when aggregated, span a total bandwidth, such as the bandwidth of the signal input to signal detection and power measurement 220.

In an example, the sub-band filters comprise high-pass and low-pass filters. For instance, integer N can be set to two, and a first sub-band filter can be a low-pass filter, and a second sub-band filter can be a high-pass filter. The upper edge of the low-pass filter can correspond to (e.g., equal) the lower edge of the high-pass filter, so that the two sub-band filters split the total bandwidth into lower and upper portions. The lower portion is filtered by the first sub-band filter, and the upper portion is filtered by the second sub-band filter.

The bandwidths of each of sub-band filter 1 302 to sub-band filter N 304 can be equal. For instance, a total bandwidth of the input signal to signal detection and power measurement 220 may be divided by the number of sub-band filters, N, to determine a bandwidth of each sub-band filter, and each sub-band filter assigned a different pass-band of the determined bandwidth, each with a different center frequency. In this way, the sub-band filters each process a portion of the total bandwidth, and each spectral component of the total bandwidth is processed by a sub-band filter. Because sub-band filters can each process a different portion of a total bandwidth, the plurality of sub-band filters are said to comprise a multi-band filter.

Furthermore, sub-band filter 1 302 to sub-band filter N 304 can be any suitable type of filters. For instance, sub-band filters can be finite impulse response (FIR) filters, infinite impulse response (IIR) filters, sparse filters, decimating filters, time-domain filters, frequency-domain filters, combinations thereof, and the like. Sub-band filters can also comprise any suitable type of coefficients, such as real-valued, complex-valued, or combinations thereof. Sub-band filters can comprise fixed coefficients or programmable coefficients. Sub-band filters may be adaptive filters, with coefficients that are automatically adjusted according to a rule, such as a least-mean squares rule.

In embodiments, the number of sub-band filters, N, is programmable and a total number of filter coefficients can be divided among N sub-band filters. For example, N can be set to two, and half of a total number of available filter coefficients can be allocated to a first sub-band filter, such as a low-pass filter, and the remaining half of the total number of available filter coefficients can be allocated to a second sub-band filter, such as a high-pass filter.

Outputs of the plurality of sub-band filters, sub-band filter 1 302 to sub-band filter N 304, are provided to a corresponding plurality of power measurement modules, power measurement 1 306 to power measurement N 308. In embodiments, the outputs of the plurality of sub-band filters are decimated before being supplied to the plurality of power measurement modules. For example, every $M^{th}$ sample from each of the plurality of sub-band filters can be supplied to the plurality of power measurement modules, while dropping other samples, for some integer M.

Power measurement 1 306 to power measurement N 308 each produce at least one power measurement by measuring a power of the corresponding sub-band filter output supplied to the power measurement module. For example, power measurement 1 306 produces at least one power measurement by measuring a power of the output of sub-band filter 1 302, and power measurement N 308 produces at least one power measurement by measuring a power of the output of sub-band filter N 304.

Power measurements by each of power measurement 1 306 to power measurement N 308 can be made in any suitable fashion, such as by way of example and not limitation, on a block basis, for each sample input to the power measurement module by adding an update term to an average power estimate, summing squares or products of complex conjugates, normalizing a sum of terms (e.g., by a number of terms used to form the sum), weighting more recent samples more heavily than older samples (e.g., using a leaky integrator), combinations thereof, and the like. In an example, a power measurement is calculated according to $P=1/L \cdot \Sigma_{i=1}^{L} |x_i|^2$ (eq. 1), where the magnitude squared of the most recent L samples, $x_i$, provided from one of the sub-band filters is summed, and the result is normalized by L.

A new power measurement can be made for each sample input to the power measurement module, or a new power measurement can be made after a prescribed number of samples have been input to the power measurement module. Hence, a power measurement can be made using data that overlaps another power measurements, (e.g., with a moving average), or power measurements can be made with input data fresh for each power measurement (e.g., by processing a block of data and clearing the data and power measurement between input blocks of data).

Furthermore, power measurement 1 306 to power measurement N 308 may be configurable to each produce more than one power measurement at a given time. For instance, the power measurement modules may produce a short-term power measurement and a long-term power measurement, where the short-term power measurement is updated more frequently than the long-term power measurement, and/or the long-term power measurement is based on older data that is not included in determining the short-term power measurement. In an embodiment, power measurement 1 306 to power measurement N 308 each produce a single power measurement at a given time, based on a same method of calculating a power measurement.

Each of power measurement 1 306 to power measurement N 308 provides at least one power measurement to decision and control module 310. Decision and control module 310 processes the power measurements from the power measurement modules to detect the presence of a signal, such as a training signal, and responsive to detecting a signal, determines a power measurement based on the power measurements from the power measurement modules. The determined power measurement is used to set at least one gain in receiver 204.

The inventors have determined that when the interference is narrowband interference, by using sub-band processing with pass-bands wider than the bandwidth of the interference, not all sub-bands are affected by the interference. Moreover, usually only a single sub-band is affected by the interference. For example, one of the sub-band filters may pass the interference, while the other sub-band filters reject the interference because the interference is outside the pass-band of all but one of the sub-band filters. Furthermore, when interference is present in a sub-band, it raises a power measurement provided from the power measurement modules for that sub-band, rather than lowering a power measurement provided from the power measurement modules for that sub-band. Hence, decision and control module 310 monitors the power measurements from the power measurement modules, power measurement 1 306 to power measurement N 308, to detect the presence of a training signal, and determine a power measurement corresponding to the training signal that is unaffected by narrowband interference.

During an initialization or startup period, a transmitter of a computing device, such as computing device 106 in FIG. 1, may begin transmitting a training signal. The training signal may be transmitted responsive to a request sent by another computing device, such as computing device 102 in FIG. 1, or the training signal may be transmitted based on an action of the transmitting device itself, e.g., computing device 106 in FIG. 1 may be a sensor in a vehicle communication system and have new sensor data to communicate to computing device 102, and therefore transmits a training signal to initiate a communication link between computing device 106 and computing device 102.

The presence of a signal, such as a training signal, is determined by decision and control module 310 by comparing power measurements from power measurement 1 306 to power measurement N 308 to a plurality of thresholds. For instance, a different threshold may correspond to each of the N channels (e.g., each of the outputs of the power measurement modules, power measurement 1 306 to power measurement N 308, may be assigned a different threshold in decision and control module 310). Because the narrowband interference will generally not decrease a power measurement, since interference from an external source is generally uncorrelated with the transmitted signal, the presence of a signal, such as a training signal, can be detected when all of the power measurements from power measurement 1 306 to power measurement N 308 are greater than the corresponding different thresholds. For example, if N=2 and $T_1$ and $T_2$ denote the thresholds for the two sub-bands, a signal, such as a training signal, is detected when the power measurement from the first sub-band is greater than $T_1$ and the power measurement from the second sub-band is greater than $T_2$.

Because different sub-bands have different spectral content, e.g., correspond to different frequency bands, signals in the different sub-bands may experience different transmission environments. For instance, signals in a sub-band corresponding to higher frequencies may be attenuated more than signals in a sub-band corresponding to lower frequencies. This situation can be caused by long cable lengths, such as a long Ethernet cable comprising network 104 in FIG. 1. Therefore, the plurality of thresholds used in decision and control module 310 can comprise more than one threshold value. For instance, each of the plurality of thresholds can be a programmable value, such as a register setting in a chip, which can be set to a threshold value independently from a threshold value set for other thresholds. In embodiments, each of the plurality of thresholds is programmable and is set to a different threshold value, one to another. In an example, each of the sub-bands is assigned one threshold per sub-band in decision and control module 310, and each of the thresholds is set to a different threshold value, such as ten thresholds for ten sub-bands that are assigned unique threshold values from one of 1/k for k=1, 2, 3, . . . 10. In another example, each of the sub-bands is assigned one threshold per sub-band in decision and control module 310, and each of the thresholds comprises a same threshold value. For instance, ten thresholds for ten sub-bands can all be assigned to the threshold value of 0.5.

Furthermore, decision and control module 310 can assign more than one threshold for each sub-band. For example, a first threshold for a sub-band may be compared with a first power measurement for the sub-band, such as short-term power measurement, and a second threshold for the sub-band may be compared with a second power measurement for the sub-band, such as a long-term power measurement. Alternatively or additionally, the first power measurement can be a current power measurement, and the second power measurement can be a previous (e.g., older) power measurement. Decision and control module 310 may require that all power measurements for all sub-bands be greater than corresponding thresholds to declare that a signal, such as a training signal, is detected.

In an embodiment, power measurement modules power measurement 1 306 to power measurement N 308 can pass the sub-band filter outputs directly to decision and control module 310. When a training signal is present, outputs of the plurality of sub-band filters should be substantially correlated (e.g., have a large degree of correlation for some delay, such as a correlation coefficient at the delay being greater than a predetermined value). Hence, decision and control module 310 can also include at least one correlator configured to correlate the outputs of the plurality of sub-band filters. Detecting the presence of the training signal can be based on the correlator determining each of the sub-band filter outputs are substantially correlated with each other.

Responsive to detecting the presence of a signal, such as a training signal, decision and control module 310 determines a power measurement that is used to set a gain in receiver 204. Because narrowband interference, when present in a sub-band, acts to increase the power measurement for that sub-band, a power measurement that is unaffected by the narrowband interference can be determined from sub-bands other than the sub-band where the narrowband interference is present. In an example, determining the power measurement in decision and control module 310 comprises setting the determined power measurement to a lowest of the plurality of power measurements provided from power measurement 1 306 to power measurement N 308. For instance, the power measurement is determined in decision and control module 310 by examining each of the power measurements for each of the sub-bands, and the determined power measurement is set to the power measurement of the sub-band that is the lowest power measurement among the plurality of sub-bands. In this way, a power measurement unaffected by the narrowband interference is quickly and efficiently determined.

In another example, determining the power measurement in decision and control module 310 comprises averaging at least two power measurements each measured from a different sub-band filter output. For instance, the sub-band with the largest power measurement from power measurement 1 306 to power measurement N 308 may be discarded, e.g., because it contains narrowband interference, and decision and control module 310 may determine a power measurement by averaging power measurements from sub-bands other than the sub-band with the largest power measurement. In an embodiment, N=3, and decision and control module 310 receives three power measurements from the power measurement modules, one for each sub-band. Decision and control module 310 determines the sub-band with the largest power measurement, and does not use this sub-band to determine a power measurement. Rather, the other two sub-bands (e.g., the two sub-bands other than the sub-band with the largest power measurement) are used to determine a power measurement in decision and control module 310 by averaging the power measurements supplied by the power measurement modules for these other two sub-bands. Averaging can be done in any suitable fashion, such as by computing a weighted average, normalizing an average, or combinations thereof. Decision and control module 310 sets at least one gain based on the power measurement determined in decision and control module 310. In some signaling protocols, a training signal can be transmitted at various power levels. The transmitted power level of the training signal may be known a priori by the receiver, such as receiver 204, or additionally or alternatively, the transmitted power level of the training signal may be determined by the receiver from the received signal. For instance, the transmitted power level of the training signal may be encoded into the training signal (e.g., by selection of a bit sequence comprising the training signal) and decoded by the receiver to determine the transmitted power level, or included with the training signal (e.g., embedded in header or metadata that accompanies the training signal) and parsed from the header or metadata by the receiver to determine the transmitted power level.

By determining a power measurement that is unaffected by narrowband interference, and by determining a power of a transmitted signal, decision and control module 310 can determine at least one gain setting used in the receiver that properly scales the received signal. For instance, an amount of attenuation from transmitter to receiver can be estimated from a difference of the transmitted power level and power measurement of the received signal. Using the transmitted power level and expected attenuation, a gain is set in the receiver for proper scaling of the received signal. In an embodiment, setting the gain comprises addressing a look-up table based on the power measurement to determine the gain. The look-up table can store various gain values corresponding to transmit power levels and ranges of received power measurements. By determining the transmit power from the training signal, such as in a header of the training signal, and by indexing the look-up table for the received power measurement, at least one gain value can be determined. In embodiments, the look-up table stores multiple gain values for a particular address input, so that gains can be distributed at various points of the receiver processing chain.

For example, multiple gains can be set in decision and control module 310. A first gain and a second gain can be set in decision and control module 310. The first gain can be provided to front end 206 in FIG. 2 to be applied to the received communications signal, e.g., before ADC 208 to properly load ADC 208 and prevent it from being overdriven, and the second gain can be supplied to the sampled signal at an appropriate position in the receiver, such as an input to adder 210, output of adder 210 (e.g., the sampled signal with the echo removed), or within equalizer 216 (e.g., at the input to equalizer 216 or input to a slicer comprising equalizer 216).

Moreover, the total power of the received signal (e.g., the signal input to signal detection and power measurement 220) is split among the sub-band filters. Hence, power measurements from the power measurement modules correspond to power in the sub-bands, rather than the power of the full bandwidth of the received signal. Therefore, setting the gain in decision and control module 310 can be based on how many sub-band filters comprise the plurality of sub-band filters, e.g., the value of N. In an example, the power measurement determined in decision and control module 310, such as by selecting the power measurement from a sub-band with a lowest power measurement, or averaging power measurements from sub-bands, is multiplied by N to determine a gain value. For instance, prior to addressing a look-up table of gain values, the determined power measurement can be multiplied by N.

In another example, prior to addressing a look-up table of gain values, the determined power measurement can be multiplied by a factor determined from the ratio of the bandwidth of the sub-band filter from which the power measurement was determined, to a total bandwidth, such as a total bandwidth of the signal input to signal detection and power measurement 220. For instance, suppose the determined power measurement in decision and control module 310 is set from a sub-band filter that comprises 15% of the bandwidth of the signal input to signal detection and power measurement 220. In this case, the determined power measurement may be scaled by $0.15^{-1}$ to determine a gain value, such as prior to addressing a look-up table of gain values.

Furthermore, responsive to detecting the presence of a training signal, decision and control module 310 can initiate various functions in receiver 204. For instance, responsive to the detecting the presence of the training signal, decision and control module 310 sends a control signal to equalizer 216 to instruct equalizer 216 to adapt equalizer coefficients, adjust a stepsize value, adjust a leakage value, or combinations thereof. In one example, responsive to the detecting the presence of the training signal, decision and control module 310 sends a control signal to timing recovery 214 to change loop gains that control loop dynamics of timing recovery 214, such as settling time and dampening factor. In another example, responsive to the detecting the presence of the training signal, decision and control module 310 can send a control signal to decoder 218 that indicates a frame or packet marker, such as the start of a frame.

In an embodiment, sub-band filter 1 302 to sub-band filter N 304, power measurement 1 306 to power measurement N 308, and decision and control module 310 comprise a System-on-Chip (SoC) or application-specific integrated circuit (ASIC). Furthermore, modules of signal detection and power measurement 220 may be implemented in hardware, software, firmware, or combinations thereof. For example, sub-band filter 1 302 to sub-band filter N 304 can be implemented in hardware, and power measurement 1 306 to power measurement N 308 can be implemented in software of firmware, e.g., using an embedded processor that executes code to perform the functions of the power measurement modules. In this case, the outputs of the plurality of sub-band filters can be decimated (e.g., downsampled) before being supplied to the power measurement modules, since the power measurement modules may run at a slower rate than the sub-band filters.

Having considered a discussion of example signal detection and power measurement 220, consider now a discussion of example methods for detecting a signal and measuring power with a multi-band filter.

Example Procedure

Figure 4:
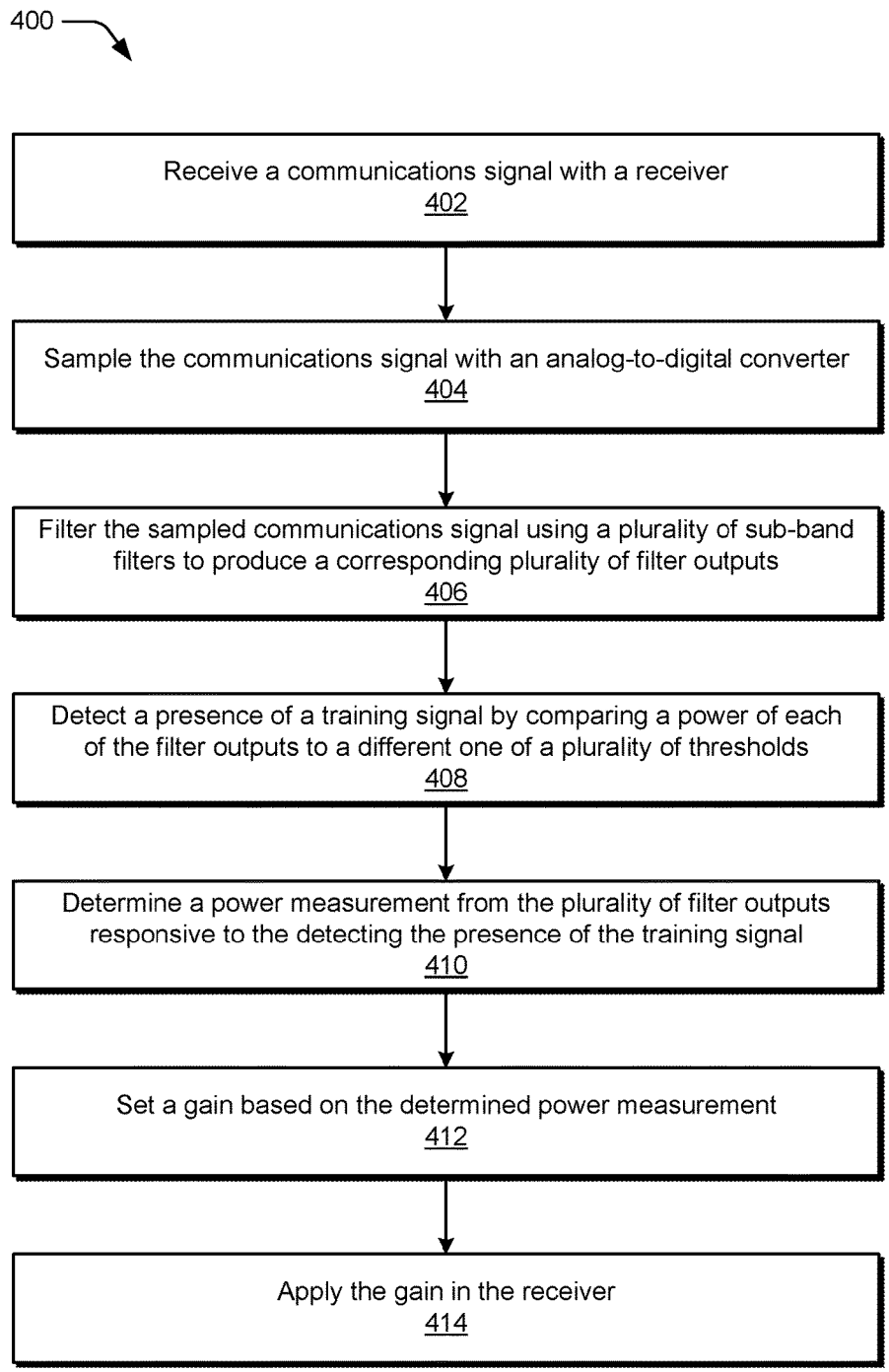
FIG. 4 illustrates an example method for detecting a signal and measuring power with a multi-band filter in accordance with one or more aspects of the disclosure.

FIG. 4 illustrates an example procedure for detecting a signal and measuring power with a multi-band filter 400 in accordance with one or more aspects of the disclosure. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In at least some embodiments the procedure may be performed by a suitably configured device or devices, such as computing device 102 described in FIG. 1.

A communications signal is received with a receiver (block 402). The communications signal may comprise a training signal. In one example, the communications signal and the receiver comprise a vehicle communications system embedded at least partially in a vehicle, such as an automobile, motorcycle, boat, aircraft, spacecraft, and the like.

The communications signal is sampled with an analog-to-digital converter (ADC) (block 404). The ADC may comprise front end circuitry of the receiver, and may be clocked based on a timing recovery module comprising the receiver, or may be clocked with a free-running clock. The ADC may comprise a single ADC, or may comprise a plurality of ADCs that each sample a portion of the communications sample.

A filter filters the sampled communications signal using a plurality of sub-band filters to produce a corresponding plurality of filter outputs (block 406). The sampled communications signal filtered by the plurality of sub-band filters may have an echo removed, such as by subtracting a signal from an echo canceller from the sampled communications signal. The sub-band filters may be bandpass filters that do not have overlapping pass-bands, and that each filter a different spectral portion of the sampled signal. Additionally or alternatively, pass-bands of the sub-band filters may overlap. The sub-band filters may have equal or different bandwidths of pass-bands.

A presence of a training signal is detected by comparing a power of each of the sub-band filter outputs to a different one of a plurality of thresholds (block 408). For instance, a presence of a training signal can be detected responsive to determining that the power of each of the sub-band filter outputs is greater than a threshold assigned to that sub-band. The plurality of thresholds assigned to the sub-bands may be a same threshold value, or be different threshold values, one to another. Detecting the presence of the training signal may be further based on outputs of the sub-band filters being substantially correlated with each other (e.g., having a correlation coefficient greater than a prescribed value).

A power measurement is determined from the plurality of sub-band filter outputs responsive to the detecting the presence of the training signal (410). In one example, the power measurement is determined from the sub-band that has a lowest power measurement. In another example, the power measurement is determined by averaging at least two power measurements each from a different sub-band filter output (e.g., each from a different sub-band). In still another example, the power measurement is determined by averaging at least two power measurements each from a same sub-band filter output (e.g., a short-term power measurement and a long-term power measurement). In embodiments, averaging power measurements comprises computing a weighted average, a normalized average, or combinations thereof.

A gain is set based on the determined power measurement (block 412). Setting the gain may comprise setting a plurality of gains. Setting the gain may also comprise addressing a look-up table based on the power measurement to determine the gain or gains. Furthermore, the gain may be set based on how many sub-band filters comprise the plurality of sub-band filters. The gain may also be set based on determining a transmitted power of the detected training signal.

The gain is applied in the receiver (block 414). Applying the gain may comprise applying a plurality of gains, at different positions in the receiver. For example, a gain may be applied in front end circuitry of the receiver to properly load an ADC (e.g., set the dynamic range of the signal to be sampled by the ADC so that the ADC does not clip the signal). A gain may also be applied to a sampled signal that has an echo removed. A gain may also be applied in an equalizer comprising the receiver. For example, a gain may be applied at the input to the equalizer, after an adder that subtracts a signal from a filter in DFE, before a slicer, the output of the equalizer, or combinations thereof.

By using sub-band processing and comparing power measurements of sub-band filter outputs to thresholds to detect a presence of a training sequence and determine a power measurement in the presence of narrowband interference, the methods described herein are robust and efficient. Because the interference is narrowband, sub-band filters can be designed that isolate the interference to one (or a small number of) sub-band filters. By monitoring powers of sub-band filter outputs, a training signal is robustly detected, because the narrowband interference does not affect all sub-band filter outputs, and does not decrease the power measurement of the sub-band(s) it occupies. Moreover, power measurements can be made using second-order statistics, which are known to converge quickly to a unique solution (e.g., cost surface is convex). Therefore, power measurements used to set gains throughout a receiver are reliable estimates that are efficiently estimated (e.g., quickly and with low computational resources). Accordingly, detecting a presence of a training sequence and determining a power measurement in the presence of narrowband interference using sub-band processing as described herein is well-suited to communications systems used in, or by, vehicles, such as automobiles, where signaling requirements are strict with regards to electromagnetic interference.

Having considered a discussion of example methods for detecting a signal and measuring power with a multi-band filter, consider now a discussion of an example device having components through which aspects of detecting a signal and measuring power with a multi-band filter can be implemented.

Example Device

Figure 5:
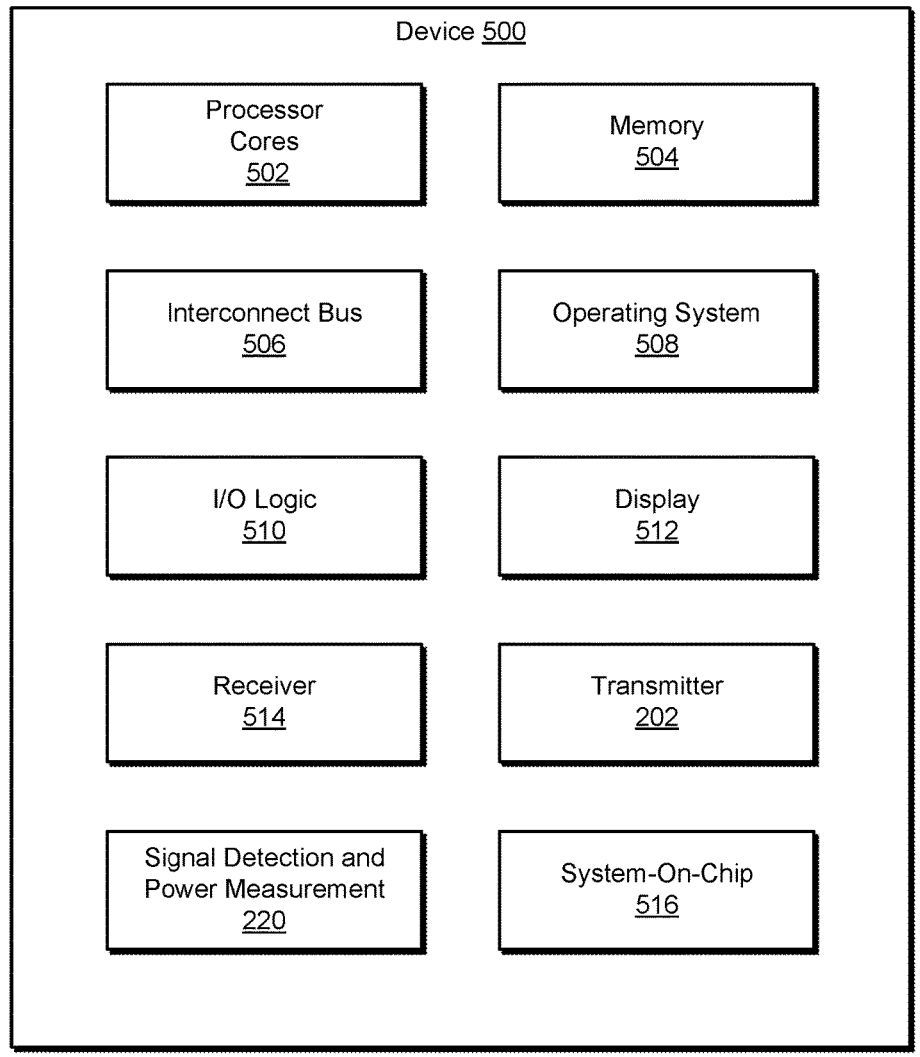
FIG. 5 illustrates an example device having components through which aspects of detecting a signal and measuring power with a multi-band filter can be implemented in accordance with one or more aspects of the disclosure.

FIG. 5 illustrates an example device 500, which includes components capable of implementing aspects of detecting a signal and measuring power with a multi-band filter. Device 500 may be implemented as, or in, any suitable electronic device, such as a computer, processor, or sensor in a vehicle, a modem, broadband router, access point, cellular phone, smart-phone, gaming device, laptop computer, desktop computer, net book, set-top-box, smart-phone, network-attached storage (NAS) device, cell tower, satellite, cable head-end, and/or any other device that may detect a signal and measure power.

Device 500 may be integrated with a microprocessor, storage media, I/O logic, data interfaces, logic gates, a transmitter, a receiver, circuitry, firmware, software, and/or combinations thereof to provide communicative or processing functionalities. Device 500 may include a data bus (e.g., cross bar or interconnect fabric) enabling communication between the various components of the device. In some aspects, components of device 500 may interact via the data bus to implement aspects of detecting a signal and measuring power with a multi-band filter.

In this particular example, device 500 includes processor cores 502 and memory 504. Memory 504 may include any suitable type of memory, such as volatile memory (e.g., DRAM), non-volatile memory (e.g., flash), cache, and the like. In the context of this disclosure, memory 504 is implemented as a storage medium, and does not include transitory propagating signals or carrier waves. Memory 504 can store data and processor-executable instructions of device 500, such as operating system 508 and other applications. Memory 504 can also store sub-band filter outputs and power measurements. Processor cores 502 may execute operating system 508 and other applications from memory 504 to implement functions of device 500, the data of which may be stored to memory 504 for future access. For example, processor cores may accept outputs of sub-band filters and determine a power measurement. Device 500 may also include I/O logic 510, which can be configured to provide a variety of I/O ports or data interfaces for communication. Device 500 also includes display 512. Display 512 may comprise any suitable type of display, such as a liquid crystal display (LCD), and be configured to provide a user interface on device 500.

Device 500 also includes receiver 514. Receiver 204 in FIG. 2 is an example of a receiver which may comprise receiver 514. Device 500 also includes transmitter 202. Receiver 514 and transmitter 202 may comprise a transceiver, such as transceiver 108 in FIG. 2.

Device 500 also includes signal detection and power measurement 220. Signal detection and power measurement 220 comprises a plurality of sub-band filters, a plurality of power measurement modules, and a decision and control module. Signal detection and power measurement 220 can be configured to detect a signal, such as a training signal, by monitoring outputs of sub-band filters and comparing the outputs of the sub-band filters to a plurality of thresholds. Responsive to detecting a training signal, signal detection and power measurement 220 may be configured to determine a power measurement and set a gain in receiver 514 based on the determined power measurement.

Device 500 also includes System-on-Chip (SoC) 516. SoC 516 comprises a variety of functions on a single chip or die, or multiple die in a single package. In embodiments, SoC comprises receiver 514 and signal detection and power measurement 220.

In one or more exemplary embodiments, the functions described may be implemented in hardware, software, firmware, or any combination thereof. If implemented in software, functions may be stored on a computer-readable storage medium (CRM). In the context of this disclosure, a computer-readable storage medium may be any available medium that can be accessed by a general-purpose or special-purpose computer that does not include transitory propagating signals or carrier waves. By way of example, and not limitation, such media can comprise RAM, ROM, EEPROM, CD-ROM or other optical disk storage, magnetic disk storage, or other magnetic storage devices, or any other non-transitory medium that can be used to carry or store information that can be accessed by a general-purpose or special-purpose computer, or a general-purpose or special-purpose processor. The information can include any suitable type of data, such as computer-readable instructions, sampled signal values, data structures, program components, or other data. These examples, and any combination of storage media and/or memory devices, are intended to fit within the scope of non-transitory computer-readable media. Disk and disc, as used herein, includes compact disc (CD), laser disc, optical disc, digital versatile disc (DVD), floppy disk and Blu-ray disc where disks usually reproduce data magnetically, while discs reproduce data optically with a laser. Combinations of the above should also be included within the scope of computer-readable media.

Firmware components include electronic components with programmable memory configured to store executable instructions that direct the electronic component how to operate. In some cases, the executable instructions stored on the electronic component are permanent, while in other cases, the executable instructions can be updated and/or altered. At times, firmware components can be used in combination with hardware components and/or software components.

The term "component", "module", and "system" are intended to refer to one or more computer related entities, such as hardware, firmware, software, or any combination thereof, as further described above. At times, a component may refer to a process and/or thread of execution that is defined by processor-executable instructions. Alternately or additionally, a component may refer to various electronic and/or hardware entities.

Certain specific embodiments are described above for instructional purposes. The teachings of this disclosure have general applicability, however, and are not limited to the specific embodiments described above.

What is claimed is:

1. A method for setting gain of a receiver, the method comprising:
receiving, via a front-end of a receiver, an analog communications signal transmitted over a wired interface, the analog communications signal bearing a training signal, a portion of bandwidth of the analog communications signal received via the wired interface being affected by interference;
dividing the analog communications signal into a plurality of sub-band outputs, the respective sub-band outputs having respective bandwidths that are less than the bandwidth of the analog communications signal;
comparing a power level of respective ones of the sub-band outputs to a corresponding power threshold;
detecting the training signal within the analog communications signal in response to ascertaining whether the power level of a respective sub-band output exceeds the corresponding power threshold to which the power level is compared;
determining that a first sub-band output is not affected by the interference in response to the power level of the first sub-band output being lower than the power level of a second sub-band output;
selecting the first sub-band output that is not affected by the interference as the selected sub-band output for power measurement of the training signal;
determining, based on the power level of the first sub-band output, a power measurement for the training signal of the analog communications signal; and
setting a gain of the front-end of the receiver in response to the determined power measurement for the training signal.

2. The method as recited in claim 1, wherein the analog communications signal is divided into the plurality of sub-band outputs using a plurality of sub-band filters.

3. The method as recited in claim 1, wherein the plurality of sub-band outputs comprises at least three sub-band outputs and the power measurement for the training signal is determined by averaging the power level of the first sub-band output with a power level of a third sub-band output, the power level of the third sub-band output being lower than the power level of the second sub-band output.

4. The method as recited in claim 1, further comprising identifying the power level of the first sub-band output as a lowest power level among respective power levels of the plurality of sub-band outputs, and wherein the power measurement for the training signal is determined based on the lowest power level of the first sub-band output.

5. The method as recited in claim 1, further comprising:
sampling, with an analog-to-digital converter of the receiver, the analog communications signal to provide a sampled communications signal;
receiving, from a transmitter portion of a transceiver in which the receiver is embodied, a reference signal that approximates the training signal; and
removing an echo of the training signal from the sampled communications signal by subtracting the reference signal from the sampled communications signal, and wherein the dividing the analog communications signal into the plurality of sub-band outputs comprises dividing the sampled communications signal with the echo removed.

6. The method as recited in claim 1, wherein:
the respective sub-band outputs into which the analog communications signal is divided have bandwidths that are approximately equal; or
the respective sub-band outputs into which the analog communications signal is divided do not overlap in frequency.

7. The method as recited in claim 1, wherein at least one of the corresponding power thresholds for the sub-band outputs is set at a lower value than others of the corresponding power thresholds to enable detection of the training signal in a portion of the analog communications signal that is attenuated by the wired interface.

8. The method as recited in claim 7, wherein the at least one of the corresponding power thresholds is set by programming a threshold value register based on a frequency band of the sub-band output to which the respective power threshold corresponds.

9. The method as recited in claim 1, further comprising configuring, in response to the determined power measurement for the training signal, at least one of:
 a digital timing recovery setting of the analog-to-digital converter;
 a filter co-efficient for an echo canceller of the receiver;
 a co-efficient of an equalizer of the receiver; or
 a setting of a sub-band filter of the receiver.

10. A communications receiver comprising:
 a front-end configured to receive an analog communications signal transmitted over a wired interference, the analog communications signal bearing a training signal, a portion of bandwidth of the analog communications signal received via the wired interface being affected by interference;
 two or more sub-band generators configured to generate a plurality of sub-band outputs from the analog communications signal, the sub-band outputs having respective bandwidths that are less than the bandwidth of the analog communications signal;
 a sub-band power comparator configured to compare a power level of respective ones of the sub-band outputs to a corresponding power threshold;
 a training signal detector configured to detect the training signal within the analog communications signal in response to ascertaining whether the power level of a respective sub-band output exceeds the corresponding power threshold to which the power level is compared;
 power measurement circuitry configured to:
  determine that a first sub-band output is not affected by the interference in response to the power level of the first sub-band output being lower that the power level of a second sub-band output;
  select the first sub-band output that is not affected by the interference as the selected sub-band output for power measurement of the training signal; and
  measure, based on the power level of the first sub-band output, a power measurement for the training signal of the analog communications signal; and
 gain circuitry configured to set a gain setting for the communications receiver in response to the determined power measurement for the training signal.

11. The communications receiver as recited in claim 10, wherein the two or more sub-band generators comprise two or more sub-band filters that are configured to divide the analog communications signal into the plurality of sub-band outputs.

12. The communications receiver as recited in claim 10, wherein the power measurement circuitry is further configured to:
 identify the power level of the first sub-band output as having a lowest power level among respective power levels of the plurality of sub-band outputs; and
 determine the power measurement for the training signal based on the lowest power level of the first sub-band output.

13. The communications receiver as recited in claim 10, wherein:

the plurality of sub-band outputs comprises at least three sub-band outputs; and
the power measurement circuitry is further configured to determine the power measurement for the training signal by averaging the power level of the first sub-band output with a power level of a third sub-band output, the power level of the third sub-band output being lower than the power level of the second sub-band output.

14. The communications receiver as recited in claim 10, further comprising:
 an analog-to-digital converter configured to sample the analog communications signal to provide a sampled communications signal; and
 an echo canceller configured to:
  receive, from a communications transmitter that is implemented with the communications receiver, a reference signal that approximates the training signal; and
  remove an echo from the sampled communications signal by subtracting the reference signal from the sampled communications signal, and wherein the two or more sub-band generators generate the plurality of sub-band outputs from the sampled communications signal with the echo removed.

15. The communications receiver as recited in claim 10, wherein the power measurement circuitry is further configured to determine the power measurement for the training signal based on a down-sampled version of the power level of the first sub-band output.

16. The communications receiver as recited in claim 10, wherein:
 the respective sub-band outputs that the two or more sub-band generators generate from the analog communications signal have bandwidths that are approximately equal; or
 the respective sub-band outputs that the two or more sub-band generators generate from the analog communications signal do not overlap in frequency.

17. A system-on-chip comprising:
 an input configured to receive an analog communications signal that is transmitted over a wired interference, the analog communications signal bearing a training signal, a portion of bandwidth of the analog communications signal received via the wired interface being affected by interference;
 at least two sub-band generators configured to generate a plurality of sub-band outputs from the analog communications signal, the sub-band outputs having respective bandwidths that are less than the bandwidth of the analog communications signal;
 a sub-band power comparator configured to compare a power level of respective ones of the sub-band outputs to a corresponding power threshold;
 a training signal detector configured to detect the training signal within the analog communications signal in response to ascertaining whether the power level of a respective sub-band output exceeds the corresponding power threshold to which the power level is compared;
 power measurement circuitry configured to:
  determine that a first of the sub-band outputs is not affected by the interference in response to the power level of the first sub-band output being lower that the power level of a second sub-band output;
  select the first sub-band output that is not affected by the interference as the selected sub-band output for power measurement of the training signal; and determine, based on the power level of the first sub-band output, a power measurement for the training signal of the analog communications signal; and gain circuitry configured to set a gain setting for the input of the system-on-chip in response to the determined power measurement for the training signal.

18. The system-on-chip as recited in claim 17, wherein the two or more sub-band generators comprise two or more sub-band filters that are configured to divide the analog communications signal into the plurality of sub-band outputs.

19. The system-on-chip as recited in claim 17, wherein the input comprises an analog front-end, gain block, amplifier, or attenuator that is configured to apply gain to the analog communications signal based on the gain setting that is set by the gain circuitry of the system-on-chip.

20. The system-on-chip as recited in claim 17, wherein the signal detection circuitry is further configured to:

identify the power level of the first sub-band output as having a lowest power level among respective power levels of the at least two sub-band outputs; and determine the power measurement for the training signal based on the lowest power level of the first sub-band output.

* * * * *